United States Patent [19]
Pompei

[11] Patent Number: 5,873,833
[45] Date of Patent: *Feb. 23, 1999

[54] EAR THERMOMETER RADIATION DETECTOR

[75] Inventor: Francesco Pompei, Boston, Mass.

[73] Assignee: Exergen Corporation, Watertown, Mass.

[ * ] Notice: The term of this patent shall not extend beyond the expiration date of Pat. No. 5,381,796.

[21] Appl. No.: 855,798

[22] Filed: May 12, 1997

Related U.S. Application Data

[63] Continuation of Ser. No. 313,744, Sep. 27, 1994, Pat. No. 5,628,323, which is a continuation of Ser. No. 889,052, May 22, 1992, Pat. No. 5,381,796.

[51] Int. Cl.[6] .......................................................... A61B 6/00
[52] U.S. Cl. ............................................. 600/474; 600/549
[58] Field of Search ............................... 600/473–75, 549

[56] References Cited

U.S. PATENT DOCUMENTS

| | | | |
|---|---|---|---|
| 3,282,106 | 11/1966 | Barnes | 73/355 |
| 3,491,596 | 1/1970 | Dean | 73/355 |
| 4,602,642 | 7/1986 | O'Hara et al. | 128/664 |
| 4,797,840 | 1/1989 | Fraden | 364/557 |
| 4,895,164 | 1/1990 | Wood | 128/736 |
| 4,932,789 | 6/1990 | Egawa et al. | 374/126 |
| 4,993,419 | 2/1991 | Pompei et al. | 128/664 |
| 5,012,813 | 5/1991 | Pompei et al. | 128/664 |
| 5,018,872 | 5/1991 | Suszynski et al. | 374/133 |
| 5,325,863 | 7/1994 | Pompei | 128/736 |
| 5,381,796 | 1/1995 | Pompei | 600/474 |
| 5,445,158 | 8/1995 | Pompei | 128/664 |

*Primary Examiner*—John P. Lacyk
*Attorney, Agent, or Firm*—Hamilton, Brook, Smith & Reynolds, P.C.

[57] ABSTRACT

A radiation detector comprises an extension shaped to be comfortably positioned in an outer ear area for obtaining temperature indications without discomfort to the subject. The extension increases non-linearly in diameter along a portion of its distal end forming a rounded distal tip. The extension is positioned in an ear canal such that the rounded tip is disposed at the opening to the ear canal. An infrared radiation sensor is positioned in the detector for receiving radiation emitted from the ear canal. An electronics unit converts the received radiation to a temperature indication.

4 Claims, 4 Drawing Sheets

EAR THERMOMETER RADIATION DETECTOR

This application is a continuation of application Ser. No. 08/313,744 filed Sep. 27, 1994, now U.S. Pat. No. 5,628,323 which is a continuation of 07/889,052 filed May 22, 1992, now U.S. Pat. No. 5,381,796.

BACKGROUND OF THE INVENTION

Radiation detectors which utilize thermopiles, pyroelectric devices and other radiation sensors to detect the heat flux from target surfaces have been used in various applications. An indication of the temperature of a target surfaces may be provided as a function of the measured heat flux. A significant application is that of tympanic temperature measurement as an alternative to traditional sublingual thermometers. A true tympanic device relies on a measurement of the temperature of the tympanic membrane in the ear of an animal or human by detection of infrared radiation. The term tympanic device has also been applied to devices which measure temperature of the tympanic membrane area including the ear canal or just the ear canal.

Particularly accurate and rapid tympanic temperature measurements are obtained with the radiation detectors presented in U.S. patent application Ser. No. 07/760,006, filed Sep. 13, 1991, and Ser. No. 07/832,109, filed Feb. 6, 1992. As described in those applications tympanic measurements are most comfortably obtained with a conical tip of small end diameter which may be inserted into the ear canal to straighten the ear canal and then tilted to scan across the tympanic membrane.

SUMMARY OF THE INVENTION

The tympanic temperature detectors presented in the above mentioned patent applications allow for comfortable, accurate and rapid tympanic temperature measurements with only moderate training of the user. However, some training and a moderate amount of care are required in inserting the probe into the ear and properly scanning to obtain an accurate measurement. Such training and care is minimal for a skilled nurse or physician but may be beyond what one can expect from an unskilled aid. Further, while a nurse or physician will likely require very accurate measurements in a critical situation, an aid would usually only be taking measurements during a routine screening process or the like where the accuracy of the above described device is not require. In accordance with the present invention, no attempt is made to obtain a direct tympanic measurement. Rather, a temperature having accuracy comparable to that of a sublingual temperature reading is obtained by detecting flux from the outer ear canal only. Since no attempt is made to view the tympanic membrane, no scanning is required and the probe tip is shaped only for ease of seating of the probe in the ear and for comfort to the patient.

In accordance with the present invention, a preferred radiation detector comprises an infrared radiation sensor for receiving radiation from an ear canal which passes through a distal end of an extension. The extension non-linearly increases in outer diameter along a portion of its length from its distal end, thus forming a rounded distal tip. The extension is adapted to be inserted into a subject's outer ear such that the rounded distal tip is disposed at the opening to the ear canal. Radiation emitted from the ear canal is received by the sensor and provided to an electronics unit which converts the received radiation to a temperature indication.

The extension is shaped to be comfortably positioned in the outer ear area without significantly extending into the ear canal for obtaining temperature indications without discomfort to the subject. In preferred embodiments the rounded tip of the extension is substantially spherical in shape and has a diameter adjacent the distal end of the extension which exceeds the diameter of the subject's ear canal. As such, the extension is substantially incapable of being inserted into the ear canal beyond its opening, the rounded tip being shaped to seal the ear canal opening. Preferably, the radius of the sphere is in the range of about 5–10 mm. For added comfort, the tip may be soft, flexible material.

Preferably, the extension has a substantially constant diameter along a second portion of its length following the rounded distal tip. The constant diameter is within a range of about 10–20 mm. The extension has an increasing diameter along a third portion of its length following the second portion.

An aperture for passing radiation emitted from an ear canal is formed at the distal end of the extension. A flat window of transparent material is positioned in the aperture. The diameter of the aperture is not more than 75% of the diameter of the second portion of the extension to ensure that the distal tip is comfortable when positioned adjacent the opening of an ear canal. The combination of the rounded distal tip and the flat aperture also ensures that the window cannot contact the outer ear tissue during measurements which would lead to measurement errors.

In preferred embodiments, the extension is coupled to a housing adapted to be held by hand. To obtain a temperature indication, a user positions the extension in a subject's ear canal such that the rounded distal tip is pressed against the tissue surrounding the ear canal opening. Radiation emitted from the ear canal is received by a radiation sensor. Battery powered electronics within the housing convert the received radiation to a temperature indication which is displayed on a housing display in less than about one second. Since the sensor receives radiation from the cooler ear canal instead of the tympanic membrane, the electronics determines the displayed temperature as a function of the received radiation compensated by an indication of ambient temperature to produce a core temperature approximation. The indication of ambient temperature may be the temperature of the probe itself through an internal sensor.

In an alternative embodiment, the extension is retractable for exposing an inner extension adapted to be inserted into an ear canal for tympanic measurement.

The temperature detector of the present invention offers several advantages over existing devices. One advantage is that the detector is easy to use even by untrained operators. Due to its rounded profile, the distal tip is practically self-guiding such that a user can properly position the extension without difficulty. The user need only insert the extension into the outer ear such that rounded tip is pressed against the ear canal opening to obtain a temperature indications. Another advantage is that the extension is shaped to fit in the outer ear area during measurements without discomfort to the subject. Yet another advantage is the speed in which temperature indications can be obtained. Temperature measurements are displayed in about 0.5 to 1.0 seconds after the detector has been powered.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
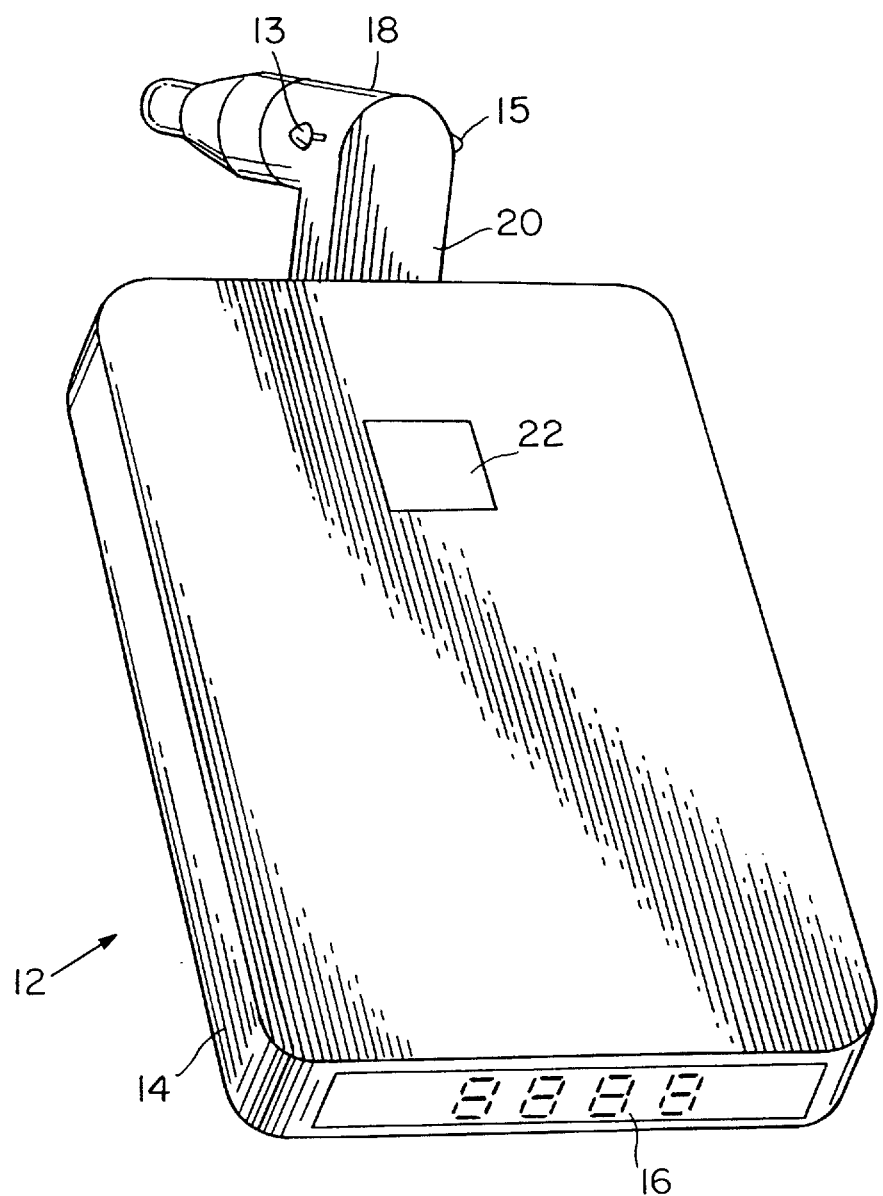
FIG. 1 illustrates a temperature detector in accordance with the present invention.

The radiation detector 12 of FIG. 1 includes a flat housing 14 with electronics (not shown) for converting sensed radiation to temperature and a digital display 16 for displaying a temperature measurement. Although the display 16 may be located anywhere on the housing, it is preferably positioned on the end so that a user is not inclined to watch it during a measurement. The detector makes an accurate measurement after being positioned in an outer ear area and displays a temperature indication within about 0.5 seconds. An on/off switch 22 is positioned on the housing. A preferred disposable element secured by pins 13 and 15 over the extension 18 is presented in U.S. patent application Ser. No. 280,546 to Pompei et al. incorporated herein by reference and will not be discussed here.

Figure 2:
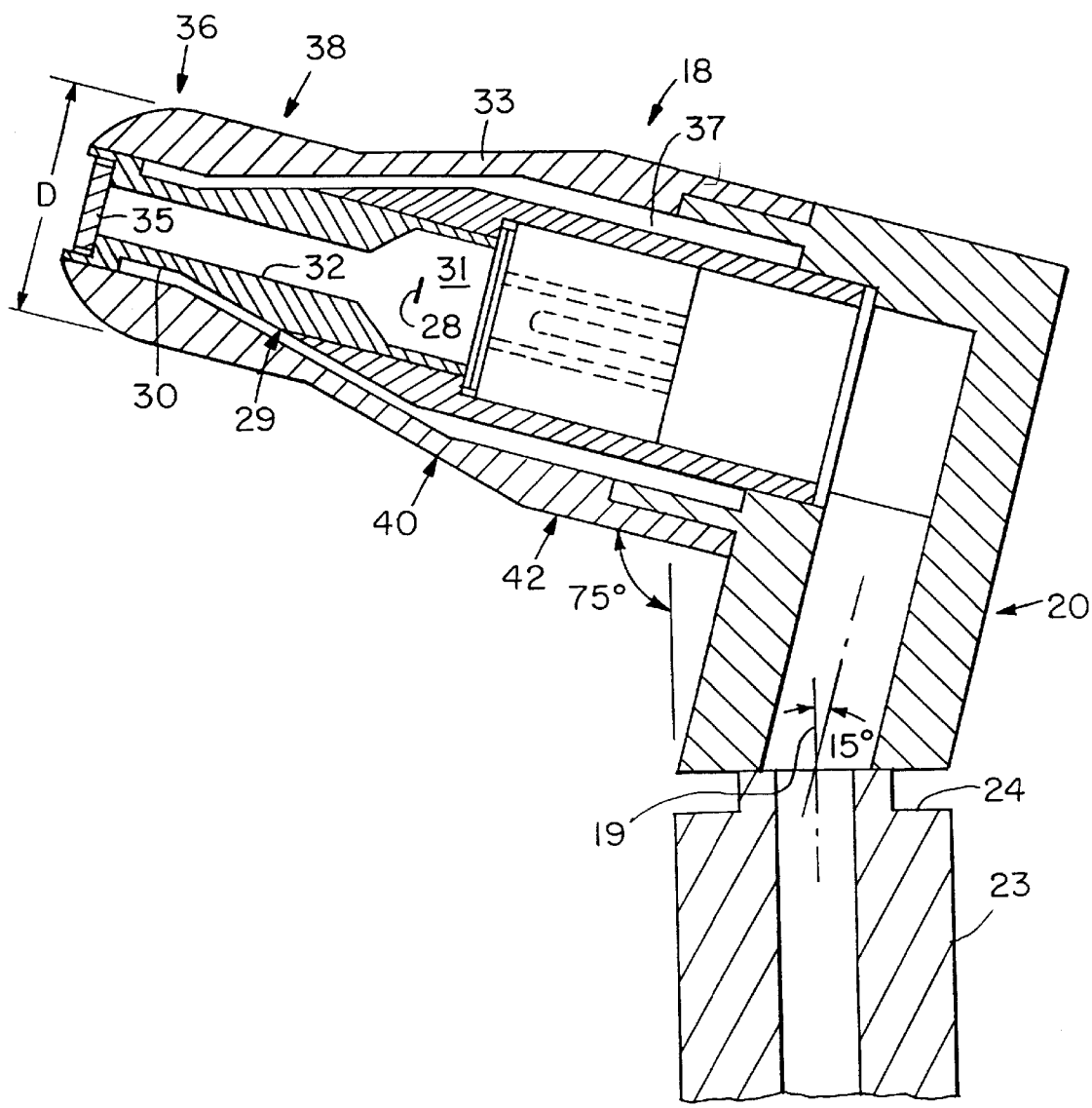
FIG. 2 is a cross-sectional view of the extension of the detector of FIG. 1 in which the thermopile radiation sensor is positioned.

A cross-sectional view of the extension 18 of the detector is shown in FIG. 2. A base portion 23 is positioned within the housing, and the housing clamps about a groove 24. The extension 18 extends orthogonally from an intermediate portion 20 of the extension which extends at an angle of about 15 degrees from a first axis 19 of the housing. As such, the extension 18 extends at an angle of about 75 degrees from the first axis. An improved assembly within the extension 18 includes thermopile radiation sensor 28. The thermopile 28 is positioned within a rear volume 31 of can 30. The can is formed of high conductivity material such as copper and filled with a low thermal conductivity gas such as Xenon. The thermopile receives incoming radiation through a radiation guide 32. The guide is gold plated to minimized oxidation and is closed at its forward end by a window 35 of transparent material. The outer sleeve 33 of the extension 18 is formed of plastic material of low thermal conductivity. The sleeve 33 is separated from the can 30 and thermal mass 31 by an insulating air space 37. Additional structural details and advantages of the extension assembly are presented in U.S. Pat. No. 5,012,813 to Pompei, which is incorporated herein by reference.

In accordance with the present invention, the extension 18 is shaped to be comfortably positioned in an outer ear area (or concha region) without significantly extending into the ear canal for obtaining temperature indications without discomfort to the subject. To that end, the extension 18 has a large diameter distal end and increases non-linearly in diameter from the distal end, thus forming a rounded distal tip 36. The rounded distal tip follows a preferred spherical contour. When the extension is positioned in an an outer ear area during a measurement, the distal tip 36 is disposed adjacent the surrounding tissue which defines the ear canal opening. Based on the combination of its diameter and profile, the distal tip seals the ear canal opening, and the extension is substantially incapable of extending into the ear canal. As such, highly accurate temperature indications can be obtained without discomfort to the subject.

The spherical distal tip 36 includes a flat aperture having a diameter at the distal end of the extension. A window 35 is positioned along the aperture for passing radiation emitted from an ear canal to the sensor 28. The diameter of the aperture is no more than about 75% of the diameter of the cylindrical portion 38 to provide a distal tip profile that will fit comfortably adjacent the ear canal opening during measurement. In a preferred embodiment, the aperature diameter is about 7 mm. The combination of the spherical contour and the flat aperature of the distal tip also ensures that the window cannot contact the outer ear tissue during measurement. Inadvertant contact with the outer ear tissue would lead to measurement errors.

The extension increases non-linearly in diameter along the distal tip portion of its length followed by a substantially cylindrical portion 38. In a preferred embodiment the cylindrical portion has a diameter of about 13 mm, although any diameter within a range of about 10–20 mm may be used. Since a normal adult ear canal is about 5–8 mm wide at its opening, the cylindrical portion 38 of the extension is incapable of insertion into an ear canal. The portion 38 is cylindrical rather than conical to minimize the diameter along its length and this minimize interference with contours of the outer ear. The extension has an increasing diameter along a third portion 40 of its length followed by a substantially cylindrical fourth portion 42 to allow for space about the thermal mass about the can 30.

For added comfort, the tip may be of soft, flexible material such as plastic foam. In that case, the rounded shape is not so critical, but it is still important that the tip be structured with a diameter of 10 mm or greater to avoid substantial insertion into the ear canal.

Figure 3:
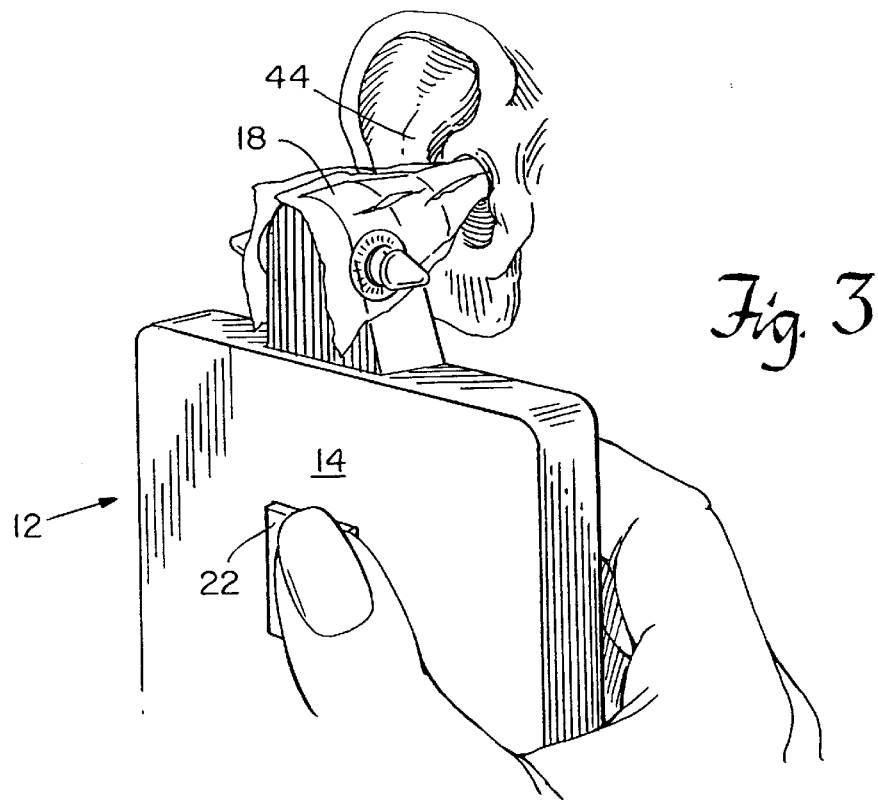
FIG. 3 is a perspective view of a human ear with the extension of FIG. 2 positioned in the outer ear.

A significant aspect of the present invention is that the detector is easy to operate even by untrained users. To obtain a temperature indication, a user simply inserts the extension 18 into a subject's outer ear area 44 such that the distal tip 36 is pressed against the tissue surrounding the ear canal opening (FIG. 3). Due to its spherical profile, the distal tip is practically self-guiding such that even untrained users can properly position the extension 18 every time. As such, any user can obtain a repeatable temperature measurement for a given subject.

Figure 4:
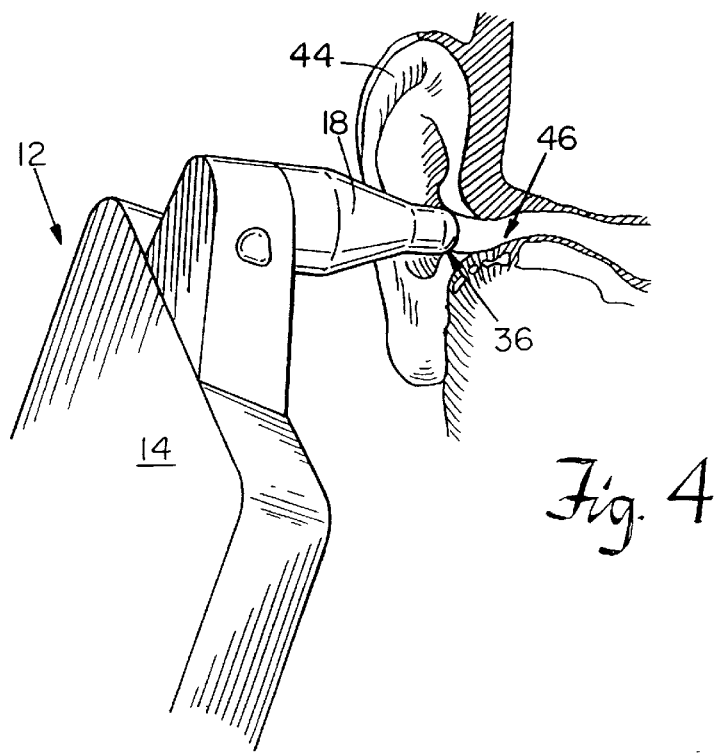
FIG. 4 is a view projected from three dimensions of a human ear with the rounded distal tip of the extension of FIG. 2 positioned adjacent the opening to the ear canal.

As shown in FIG. 4, a user positions the extension in the outer ear such that the spherical distal tip 36 seals the ear canal opening 46 in order that the thermopile only receives radiation emitted from the ear canal area during measurements. The user then presses the power switch 22 and electronics convert radiation received by the thermopile into a temperature indication displayed on the display within about 0.5 seconds from being powered. More specifically, the electronics determine the displayed temperature as a function of received radiation compensated by an indication of ambient temperature to provides core temperature approximation. Such rapid core temperature measurements are possible as the response time of the thermopile is only about 0.1 seconds. The remainder of the measurement time is required for power-on setup time for the electronics and for electronics processing time. The layout and operational details of the electronics are explained in U.S. Pat. No. 5,012,813 to Pompei, incorporated herein by reference.

The electronics include a peak mode of operation where the display reads the maximum value found since power-on until a preset period of time or, optionally, through action of the power-on button. By rotating the probe, the ear canal is scanned and, at some orientation of the probe during that scan, one can be assured that the maximum temperature is viewed.

True core temperature of the body is generally considered to be the temperature within the pulmonary artery. Other areas can provide core temperature approximations. The deep tissue measurements, including esophageal, tympanic, rectal and bladder provide approximations very close to true core. Superficial temperature measurements, including oral, axillary and outer ear, provide core temperature approximations which are somewhat lower than true core.

As in the device of U.S. Pat. No. 5,072,813, the sensed temperature is compensated by an ambient temperature measurement to provide a desired core temperature approximation. This compensation is particularly important where the measurement is based on heat flux from a cooler region of the ear canal near its opening rather than from near the tympanic membrane. Based on an assumed constant $K_c$, any core temperature approximation can be computed as:

$$T_{cr} = T_a + \frac{T_e - T_a}{K_c}$$

where $T_{cr}$ is the core temperature approximation, $T_a$ is sensed ambient temperature, and $T_e$ is the ear temperature computed from the thermopile output and from sensed ambient temperature according to conventional flux to temperature conversions.

An important aspect of any temperature measurement is the reproducibility of the measurement. For example, the tympanic temperature detectors in the above mentioned applications provide measurement with a standard deviation of about 0.2° C. when compared to pulmonary artery temperature. This compares favorably with other deep tissue measurements such as rectal and esophageal and is significantly better than typical oral measurements of about 0.5° C. Ear thermometers without temperature compensation have a standard deviation comparable to oral temperature measurements. With ambient temperature compensation, measurements by the present device have a standard deviation of about 0.35° C. when compared to oral; whereas for ear thermometers without ambient temperature compensation the standard deviation is over 0.5° C. when compared to oral.

Of the available body temperature measurements, oral temperature is most widely used and is thus the measurement with which medical personnel are most familiar. The standard deviation of the present ear temperature measurement compares favorably with that of oral temperature but is less than that of deep tissue measurements. For these reasons, in the preferred implementation of the present invention the computed core temperature approximation is correlated to oral Entemperature. That is, the assumed constant $K_c$ is selected such that the mean temperature measurement using the present device is about equal to the mean temperature measurement with oral thermometers. A constant $K_c$ equal to 0.95 has been found acceptable.

Figure 5:
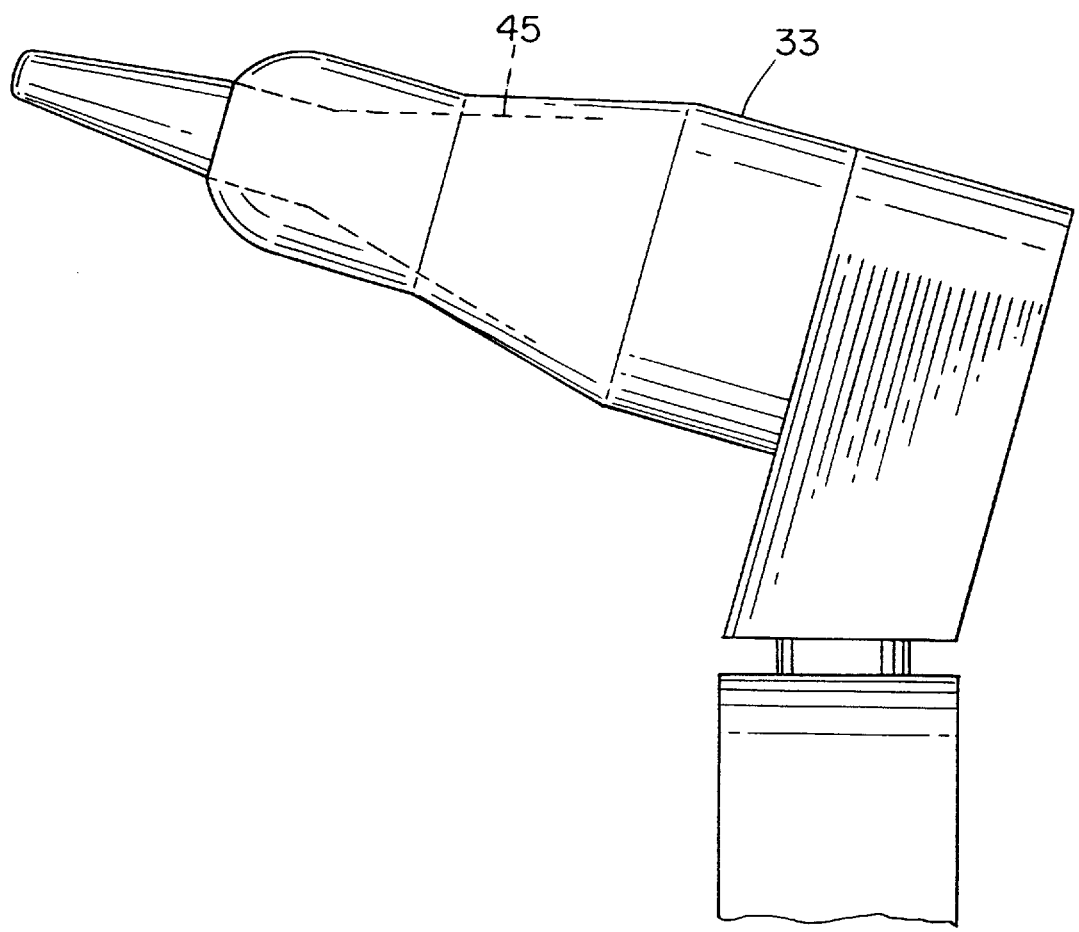
FIG. 5 illustrates an alternative probe tip having a telescoping conical tip with the spherical tip.

In an alternative embodiment shown in FIG. 5, the detector has a convertible extension. More specifically, the outer sleeve 33 is retractible or removable to expose a conical sleeve 45. The diameter at the distal end of the pediatric extension 45 is in the range of about 3–6 mm. As such, the extension is particularly useful for tympanic measurement of subjects having small outer ear regions such as children. The dimensions of the conical sleeve 45 are preferably as described in the above-mentioned patent applications for tympanic, as opposed to ear canal, measurement.

While the invention has been particularly shown and described with reference to preferred embodiments thereof, it will be understood by those skilled in the art that various changes in form and details may be made therein without departing from the spirit and scope of the invention as defined by the appended claims.

I claim:

1. A temperature detector comprising:

an extension increasing non-linearly in diameter along a portion of its length from a distal end of the extension to form a rounded distal tip, the extension being adapted to be inserted into an outer ear such that the rounded distal tip is disposed adjacent to an ear canal opening, the rounded tip having a diameter adjacent a distal end of the extension such that the extension is substantially incapable of being inserted into an ear canal;

a thermopile infrared radiation sensor positioned in the detector for receiving radiation from the ear canal which passes through the distal end of the extension; and an electronics unit for converting radiation received by the sensor to temperature, the electronics being adapted to provide a peak temperature reading with scanning of the sensor relative to an ear.

2. A temperature detector as claimed in claim 1 further comprising a window positioned in an aperture at the distal tip.

3. A temperature detector as claimed in claim 1 wherein the rounded distal tip is adapted to seal the opening of the ear canal.

4. A temperature detector as claimed in claim 1 wherein the electronics unit provides the temperature as a function of the received radiation compensated to provide a core temperature approximation.

\* \* \* \* \*